US012178273B2

(12) United States Patent
Coffman

(10) Patent No.: US 12,178,273 B2
(45) Date of Patent: Dec. 31, 2024

(54) PERSONAL COOLING DEVICE

(71) Applicant: Bobby Coffman, N. Las Vegas, NV (US)

(72) Inventor: Bobby Coffman, N. Las Vegas, NV (US)

( * ) Notice: Subject to any disclaimer, the term of this patent is extended or adjusted under 35 U.S.C. 154(b) by 912 days.

(21) Appl. No.: 17/063,685

(22) Filed: Oct. 16, 2020

(65) Prior Publication Data

US 2022/0117343 A1 Apr. 21, 2022

(51) Int. Cl.
*A42B 1/008* (2021.01)
*B05B 9/08* (2006.01)
*B05B 15/62* (2018.01)

(52) U.S. Cl.
CPC ............ *A42B 1/008* (2013.01); *B05B 9/0861* (2013.01); *B05B 15/62* (2018.02)

(58) Field of Classification Search
CPC .. A42B 1/008; B05B 1/14; B05B 1/20; B05B 1/205; B05B 1/207; B05B 9/08; B05B 9/085; B05B 9/0855; B05B 9/0861; B05B 15/00; B05B 15/62; F24F 6/14; F24F 2006/146; F24F 2221/12
USPC ......................................... 239/152–154, 289
See application file for complete search history.

(56) References Cited

U.S. PATENT DOCUMENTS 5,620,140 A * 4/1997 Utter ....................... B05B 15/62 239/153
5,715,533 A * 2/1998 Stein ........................ A42C 5/04 2/209.13
6,050,099 A * 4/2000 Lopa ......................... A61F 7/10 62/304
6,427,467 B1 * 8/2002 Bell ......................... A42C 5/04 2/181.6
6,481,642 B1 * 11/2002 Louis, Jr. .............. B05B 9/0833 239/152
7,127,907 B2 * 10/2006 Tu ............................ A42C 5/04 62/259.3
10,603,680 B2 * 3/2020 Laikind ................... B05B 12/12
11,193,680 B1 * 12/2021 Caballero ................. F24F 6/14
2006/0112707 A1 * 6/2006 Tu .......................... A42B 1/008 62/304
2007/0114301 A1 * 5/2007 Blake ........................ A45F 3/16 239/152
2008/0023570 A1 * 1/2008 Tu .......................... A42B 1/008 239/548
2015/0273502 A1 * 10/2015 Bell ...................... B05B 9/0816 239/153

(Continued)

FOREIGN PATENT DOCUMENTS

GB 2299655 A * 10/1996 ............. A42B 1/008

*Primary Examiner* — Darren W Gorman
(74) *Attorney, Agent, or Firm* — Lewis Roca Rothgerber Christie LLP

(57) ABSTRACT

A method and apparatus comprising a headgear that has a channel conduit implemented therein, preferably on a brim of the headgear. The channel conduit is operatively connected to a liquid source via a conduit. The liquid source holds a liquid, such as water. A liquid pumping means in the liquid source pushes the liquid, under pressure, through the conduit, into the channel conduit. Tiny openings in the channel conduit expel the liquid in the form of minute droplets, which readily evaporate because of their tiny size. Their evaporation produces a cooling effect in an area around the channel conduit, such as around the facial area of a user wearing the apparatus.

13 Claims, 2 Drawing Sheets

(56) References Cited

U.S. PATENT DOCUMENTS

| | | | | |
|---|---|---|---|---|
| 2018/0042327 | A1 * | 2/2018 | Taylor | A61F 7/10 |
| 2021/0045483 | A1 * | 2/2021 | Yeh | A42B 1/008 |

* cited by examiner

PERSONAL COOLING DEVICE

FIELD OF INVENTION

This invention concerns cooling devices, and more specifically, to a portable device for personal cooling.

BACKGROUND

On hot days, particularly during the summer, outdoor temperatures can reach fairly high levels. When people have to be outdoors, such as for work, for recreation, etc, the heat and the beating sun can become painful to endure. People desire relief from exposure to the heat and the sun. Usually, they prefer some sort of cooling effect, even if temporary.

Some people tend to stay indoors, such as in an air-conditioned premises, during such hot days. The temperature-controlled indoor environment provides relief from the heat and the sun. However, staying indoors is not always an option for everyone for an extended period of time. Some individuals' work requires them to be outdoors, such as landscaping workers, construction workers, utility company workers, and the like. Others spend the day outdoors for personal reasons, such as at an amusement park, where one is exposed to the heat and the sun. Temporary relief may be available by stepping indoors somewhere with a cooled environment for a few minutes. However, one has to return back outdoors and continue their day's activities, whereby the heat and sun are unavoidable.

People seeking relief from the heat on a hot day may carry a small portable fan for personal cooling purposes. Some personal portable fans may even be battery-operated, providing airflow for an extended period of time. However, such fans only blow the hot ambient air on the person. They don't provide cooling per se. Therefore, the relief they provide from the heat and the sun is very limited. Further, blowing the hot ambient air upon oneself on a hot day is not necessarily a pleasant experience.

Other devices that actually provide cooling per se are not conveniently portable. These include, for example, large water-cooled or air conditioning devices. One cannot carry them around while engaging in an outdoors activity, it would not be practical. They are not a proper solution for the task.

Accordingly, there is a need for a portable device that provides personal cooling outdoors on a hot or sunny day, which device is convenient to carry and use.

COPYRIGHT NOTICE

© 2020 Bobby Coffman. The disclosure in this patent document includes material that is subject to copyright protection. The copyright owner consents to fair use by facsimile reproduction of the patent document or of the patent disclosure as it appears in the U.S. Patent and Trademark Office's records. Apart from that, all copyright rights to the disclosure herein are expressly reserved. 37 CFR § 1.71(d).

SUMMARY OF THE INVENTION

A headgear article is provided, having a peripheral edge, such as a brim. The headgear's peripheral edge comprises a channel that runs substantially around the peripheral area of the headgear.

The channel includes a channel conduit that allows a liquid to flow through it. In one embodiment, the liquid flowing through the channel conduit is water. The liquid may flow under pressure through the channel conduit.

The channel conduit is operatively connected to a liquid source, such as via a conduit. The liquid source may be a bottle, or any container of liquid. The conduit allows liquid to flow from the liquid source to the channel conduit.

The liquid source includes a means to apply pressure on the liquid. The pressurized liquid is pumped, under pressure, through the conduit, into the channel conduit. This results in pressurized liquid flowing through the channel conduit.

The channel conduit includes a means to expel the liquid. Such means to expel the liquid may comprise tiny openings in the channel conduit. In an alternate embodiment, the means to expel the liquid may be misting nozzles, which are known in the art.

The means to expel the liquid causes the pressurized liquid in the channel conduit to be expelled in the form of minute droplets of liquid, which results in a mist-like appearance around the area of the channel. These minute droplets of liquid readily evaporate because of their tiny size. The evaporation process is endothermic, thereby producing a cooling effect in the area of the mist-like liquid around the channel. If the headgear is worn by a person during use, the cooling effect is produced around the person's facial area.

The means to pump the liquid through the conduit preferably comprises a pressure-adjustment means, whereby the amount of pressure of the pumped liquid flowing through the channel conduit can be selectively increased or decreased by the user. The greater the pressure of the liquid in the channel, the greater the amount of liquid expelled as minute droplets through the means to expel the liquid. The more the amount of liquid that is thus expelled as minute droplets, the greater the cooling effect that will be produced as all those minute droplets evaporate. This cooling effect will be most pronounced around the facial area of the user.

BRIEF DESCRIPTION OF THE FIGURES

The invention can be better understood with reference to the figures. In these figures, like reference numerals designate corresponding parts throughout the different figures and views.

DETAILED DESCRIPTION

The systems, methods, and apparatus of the present invention are described below with reference to the figures. The description and figures are for illustrative purposes only, they do not limit the true scope and spirit of the present invention. The true scope and spirit of the present invention is evidenced by all parts of the disclosure herein, including but not limited to the Summary, the Figures, the Detailed Description, and the Claims, along with equivalents thereof.

Figure 1:
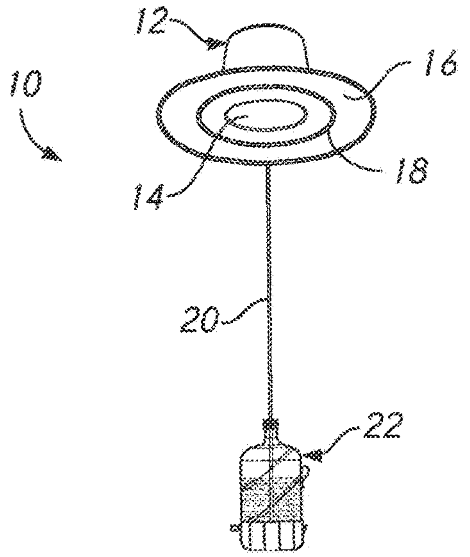
FIG. 1 shows a direct view of one embodiment of the apparatus of the present invention.

Referring to FIG. 1, one embodiment of apparatus 10 of the present invention is shown. Apparatus 10 comprises a headgear 12. Headgear 12 may be any article of headgear that may be worn by a user around the user's head area that is known in the art or that may be conceived of in the future. The different parts of headgear 12 may be constructed of any material, or any combination of materials, appropriate for such use.

Figure 2:
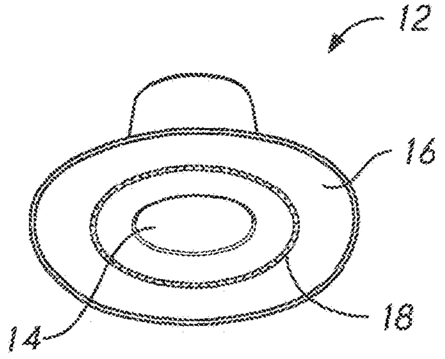
FIG. 2 shows an article of headgear according to one embodiment of the present invention.

Referring to FIG. 2, another view of headgear 12 is shown. Headgear 12 comprises a central portion 14. Central portion 14 in headgear 12 is typically designed to accommodate the head of a user wearing headgear 12. Central portion 14 may have any shape and form, which will vary from one embodiment to another. The key is that headgear 12 can at least partially accommodate the head of a user. All embodiments of headgear 12 and central portion 14 are anticipated and are intended to be covered by the present claims.

Headgear 12 comprises a brim 16. Brim 16 has a periphery that runs around central portion 14. Brim 16 typically runs peripherally around the head of a user wearing headgear 12. Brim 16 may have any shape, and its shape will usually vary from one embodiment to another. In the embodiment shown in FIG. 1, brim 16 is relatively flat, with a circular shape extending all the way around the periphery of central portion 14. All embodiments of brim 16 on headgear 12 are anticipated, and are intended to be covered by the present claims.

Headgear 12 comprises a channel 18. In one embodiment, channel 18 is implemented integrally in the brim 16, and runs the entire length, or circumference, of brim 16. In other embodiments, channel 18 runs through only a portion of brim 16. In yet other embodiments, channel 18 runs through different portions of brim 16. Further, channel 18 may be implemented differently in alternate embodiments of the present invention. For example, in an alternate embodiment of the present invention, headgear 12 may have the channel 18 implemented in central portion 14 while headgear 12 either has no brim 16 or only has a small brim 16. All such variations and embodiments of the implementation of channel 18 in headgear 12 are anticipated as they do not depart from the spirit and scope of the present invention.

Channel 18 comprises a channel conduit 24. Channel conduit 24 has a hollow orifice running through its length, that allows liquid to flow through it. In one embodiment, channel conduit 24 has a tubular shape. The construction of channel conduit 24 may comprise any suitable material, such as plastic, PVC, rubber, silicone, or the like. All suitable materials for the construction of channel conduit 24 are, therefore, anticipated. The construction and walls of channel conduit 24 are preferably strong enough to accommodate pressurized liquid flowing through the orifice therein.

Channel conduit 24 is operatively connected to a first end of a conduit 20. Conduit 20 has a hollow orifice that allows liquid to flow through it, and typically has a tubular shape. The construction and walls of conduit 20 are preferably strong enough to accommodate pressurized liquid flowing through conduit 20. The construction of conduit 20 may comprise any suitable material, such as plastic, PVC, rubber, silicone, or the like, that is appropriate for such use. All materials suitable for the construction of conduit 20 are, therefore, anticipated. The material is preferably flexible, whereby conduit 20 has at least some flexibility to it.

The first end of conduit 20 and channel conduit 24 are operatively connected to each other in a manner whereby liquid, or pressurized liquid, may flow from conduit 20 to channel conduit 24. The operative connection between channel conduit 24 and first end of conduit 20 is preferably substantially watertight. The liquid traveling therethrough will usually be under pressure, which will cause any leaks to be more exaggerated, when leaks are undesirable.

A second end of conduit 20 is operatively connected to a liquid source 22. In the embodiment shown in FIG. 1, liquid source 22 is a container that comprises a cavity 26 designed to hold and carry liquid. Liquid source 22 may have any size or shape, provided it has a cavity 26 to hold and carry liquid. In one embodiment, liquid source 22 is a bottle.

Figure 6:
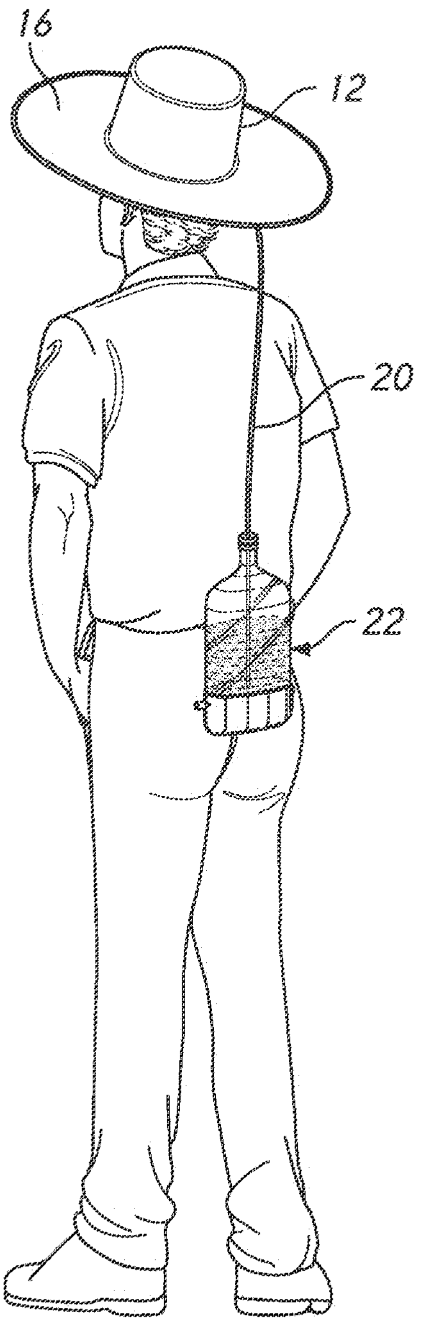
FIG. 6 shows a perspective view of a person wearing the apparatus of FIG. 1 according to one embodiment of the present invention.

In one embodiment, liquid source 22 includes a clip means 27 that is substantially rigidly attached thereto. Clip means 27 may be any clip or attachment means known in the art. Clip means 27 allows a user carry liquid source 22 more conveniently by clipping it to his clothing, such as to his pants or to a belt. FIG. 6 shows a person wearing apparatus 10, with the liquid source 22 clipped to his clothing with clip means 27.

Figure 3:
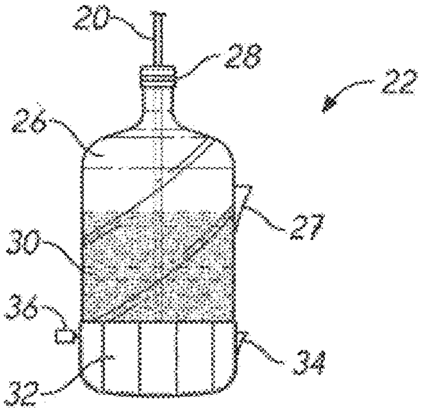
FIG. 3 shows one embodiment of a container that serves as a liquid source in the apparatus of FIG. 1.

Referring to FIG. 3, one embodiment of liquid source 22 is shown. Liquid source 22 includes an opening means 28, which can be operably removed from or operably implemented on liquid source 22 in a substantially watertight manner. Removing opening means 28 from liquid source 22 provides access to cavity 26, whereby a user may selectively remove opening means 28 from liquid source 22 and fill cavity 26 with a liquid 30. In one embodiment, liquid 30 is water. In one embodiment, opening means 28 is a lid with threading whereby opening means 28 can be twisted to threadedly engage with corresponding threading on liquid source 22. In an alternate embodiment, opening means 28 is a rubber stopper that can be slidingly implemented or removed from liquid source 22, and is held in place frictionally while implemented on liquid source 22.

The second end of conduit 20 is preferably connected to liquid source 22 in a substantially watertight manner. In one embodiment, the second end of conduit 20 runs into cavity 26 via an opening in opening means 28. Preferably, conduit 20 runs all the way to the bottom of cavity 26, whereby it can access liquid 30 during operation even when the levels of liquid 30 in cavity 26 are running low. In an alternate embodiment, conduit 20 operatively connects to an extension member in liquid source 22 at opening means 28. The extension member extends to the bottom of cavity 26. The extension member includes an orifice through the length of the extension member. The extension member thus extends conduit's 20 access to liquid 30 at the bottom of cavity 26, while conduit 20 may be selectively operatively connected to, or be selectively removed from, liquid source 22 at opening means 28.

The size of cavity 26 in liquid source 22 may vary from embodiment to embodiment, and will typically depend on the cooling requirements or performance capacity required for that particular embodiment. Cavity 26 in the respective liquid source 22 will typically determine the performance capacity of a particular embodiment as the volume of cavity 26 will limit the amount of liquid 30 that the particular liquid source 22 can hold. In one embodiment, the volume of the cavity 26 is approximately one liter.

Liquid source 22 has a liquid pumping means for pumping liquid 30 in cavity 26 under pressure. In one embodiment, the liquid pumping means is a manual pump that may be utilized to pressurize liquid 30 in cavity 26. Manual pumps are known in the art, wherein a user manually pumps the pump's handle to generate desired pressure. That pressure inside a cavity pumps liquid in the cavity under pressure.

In an alternate embodiment, the liquid pumping means is an electric pump. Electric pumps are known in the art for pumping liquid, and are commonly used for pumping water under pressure. In the embodiment shown, an electric pump 32 is implemented integrally in the liquid source 22. Electric pump 32 is preferably battery-operated, which helps make device 10 portable with one or more portable batteries. In one embodiment, electricity is supplied to said electric pump by one or more of, or a combination of, 9-volt batteries, D batteries, AA batteries, and/or AAA batteries.

Electric pump 32 has a switch 34 in one embodiment, which allows a user to turn the electric pump 32 on and off. The user may thus selectively choose to turn on apparatus 10 with switch 34 for use, and turn it off for non-use.

In one embodiment, electric pump 32 may include a pressure adjustment means 36. In one embodiment, pressure adjustment means 36 is a rotary dial, which controls the amount of voltage and/or electric current that is delivered to electric pump 32 from the battery. The amount of voltage and/or electric current will control the operation of electric pump 32 with respect to how much liquid 30 it pumps or how much pressure it generates for liquid 30 in cavity 26. A user may thus selectively control the amount of liquid 30 that is pumped, and therefore utilized, during operation of apparatus 10 by adjusting pressure adjustment means 36.

During operation of apparatus 10, liquid 30, which is water in one embodiment, is pumped under pressure from cavity 26. Liquid 20 travels from the liquid source 22, via conduit 20, to channel conduit 24. As a result, liquid 30 flows under pressure through channel conduit 24 when apparatus 10 is in operation.

Channel conduit 24 comprises a means to expel liquid 30 flowing therethrough under pressure. In one embodiment, channel conduit 24 comprises tiny openings 42, which allow liquid 30 to be expelled from channel conduit 24. Preferably, tiny openings 42 are tiny enough that when liquid 30 is expelled from them under pressure, liquid 30 takes the form of minute droplets 40 of liquid 30. The minute droplets 40 of liquid 30 form a mist-like appearance in the area around tiny openings 42. The expelled minute droplets 40 of liquid 30 begin evaporating readily because of their minute size. The evaporation process is endothermic, which produces a cooling effect at the location of the evaporation. In some instances, such evaporation process can reduce temperatures by up to 35 degrees Fahrenheit at the location of the evaporation.

Figure 7:
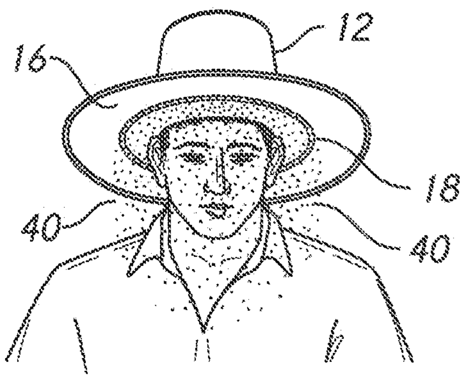
FIG. 7 shows a facial area of the person wearing the article of headgear of the apparatus of FIG. 6 while the apparatus is in operation.

This cumulative cooling effect from all the evaporating minute droplets 40 occurs in the area around channel conduit 24. If headgear 12 is being worn by a user during operation of apparatus 10, the cooling effect is produced around the facial area of the user. FIG. 7 shows a facial area of a person wearing headgear 12 while apparatus 10 is operating, causing a foggy mist-like appearance of minute droplets 40 of liquid 30 around the user's facial area.

Figure 4:
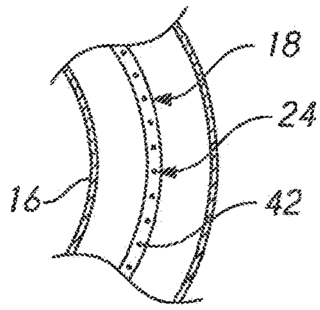
FIG. 4 shows a perspective view of a section of the article of headgear of FIG. 2.

FIG. 4 shows a section of headgear 12 comprising a portion of the brim 16.

Figure 5A:
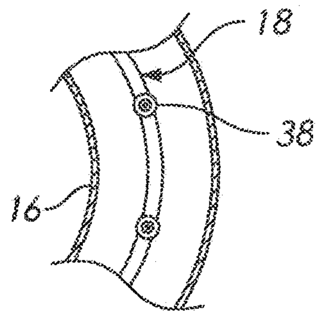
FIG. 5*a* shows a perspective view of a section of an alternate embodiment of the article of headgear of FIG. 2.
Figure 5B:
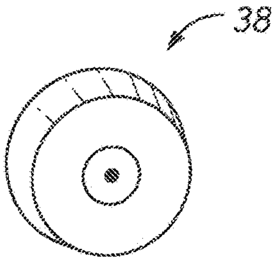
FIG. 5*b* shows an enlarged view of a mister nozzle from the embodiment of the article of headgear of FIG. 5*a*.

Channel 18 is shown integrally implemented in brim 16, with channel conduit 24 therein. Channel conduit 24 includes tiny openings 42 that form the means to expel liquid 30. In alternate embodiments, however, the means to expel liquid 30 may be implemented differently. Referring to FIG. 5*a*, a perspective view of a section of headgear 12 according to an alternate embodiment of the present invention is shown. Channel 18 is shown integrally implemented in brim 16, with channel conduit 24 therein. However, in this embodiment, the means to expel liquid 30 is implemented differently. Instead of tiny openings 42 in channel conduit 24, it comprises a plurality of mister nozzles 38 operatively connected to channel conduit 24. Mister nozzles are known in the art, and are commonly used for creating mist from a liquid, usually water, being delivered thereto under pressure. FIG. 5*b* shows an enlarged view of mister nozzle 38.

In one embodiment, there are five mister nozzles 38 implemented on channel conduit 24, each equally spaced apart. It is anticipated that the number of mister nozzles 38 implemented on channel conduit 24, the size of mister nozzles 38, their placement with respect to each other, and the like, will vary from one embodiment to another. Such design or implementation will depend on the desired performance requirements for the respective embodiment. All such embodiments are consistent with the spirit and scope of the present invention, and are therefore intended to be covered by the present claims.

It is anticipated that the size, spacing, number, etc, of tiny openings 42 in channel conduit 24 will vary from embodiment to embodiment. The higher the number of openings, the greater the amount of liquid 30 that will be expelled in the form of minute droplets 40. Therefore, the number of, and the size of, tiny openings 42, even the spacing and positioning of tiny openings 42, can be customized in accordance with the particular needs or performance requirements for each respective embodiment. All such embodiments are consistent with the spirit and scope of the present invention, and are therefore anticipated and intended to be covered by the present claims.

It is anticipated that the layout of channel conduit 24 does not have to be relatively linear as depicted in FIGS. 1 and 2. In alternate embodiments, channel conduit 24 can be implemented in a zigzag pattern, or even in a circular pattern, to increase the total length of the channel conduit 24, thereby increasing the amount of tiny openings 42 that channel conduit 24 may have to expel liquid 30 as minute droplets 40. Such exaggeration of the length of channel conduit 24 will result in a greater amount of liquid 30 being expelled, resulting in a greater amount of cooling produced by apparatus 10.

It is anticipated that channel conduit 24 may be implemented on headgear 12 via a different configuration. For example, in an alternate embodiment channel conduit 24 may not run through a channel. Instead, it may be external from the headgear 12, and be attached to headgear 12 with an attachment means such as clips, velcro, plastic loops, plastic ties, or the like. Such alternate implementations of channel conduit 24 in or on headgear 12 are anticipated as they are consistent with the spirit and scope of the present invention, and are intended to be covered by the present claims.

Although the devices, systems, apparatus, and methods have been described and illustrated in connection with certain embodiments, variations and modifications will be evident to those skilled in the art. Such variations and modifications may be made without departing from the scope and spirit of the present disclosure, and are therefore anticipated. The description and teachings herein are thus not to be limited to the precise details of methodology or construction set forth herein because variations and modification are intended to be included within the scope and spirit of the present disclosures and teachings.

I claim:

1. A cooling device, comprising:

a headgear configured to fit on a head of a user, said headgear comprising a brim and a channel implemented in said brim;

a first conduit implemented in said channel, said first conduit comprising a plurality of openings at a bottom side of said brim, wherein said first conduit is implemented in a circular pattern extending around a periphery of a central portion of said headgear and said plurality of openings are equally distanced from said periphery of the central portion; and a liquid source operatively connected to said first conduit, said liquid source comprising:

a cavity in said liquid source, said cavity able to hold a volume of liquid, and a pump for pumping said liquid in said cavity to said first conduit;

wherein said plurality of openings are configured to expel said liquid as minute droplets of the liquid around a facial area of said user.

2. The cooling device of claim 1, wherein said pump is a mechanical pump physically operable to pump said liquid.

3. The cooling device of claim 1, further comprising a portable battery in electrical communication with said pump, wherein:

said pump is an electric pump operable to pump said liquid; and said portable battery is operable to deliver electricity to said electric pump.

4. The cooling device of claim 3, wherein said electric pump comprises:

a switch, said switch operable to turn said electric pump on or off; and a controller, said controller selectively operable to adjust a voltage or a current delivered to said electric pump by said portable battery.

5. The cooling device of claim 1, wherein the operative connection between said first conduit and said liquid source comprises a second conduit, wherein:

said second conduit has a first end and a second end;

said first end of said second conduit is operatively connected to said first conduit in a substantially watertight manner; and said second end of said second conduit is operatively connected to said liquid source in a substantially watertight manner.

6. The cooling device of claim 5, wherein said second end of said second conduit has access to said volume of liquid in said cavity.

7. A method of personal cooling, comprising:

accommodating a headgear on a head of a user, said headgear comprising a brim and a channel implemented in said brim;

implementing a first conduit in said channel in a circular pattern extending around a periphery of a central portion of said headgear, said first conduit comprising a plurality of openings at a bottom side of said brim;

operatively connecting a liquid source to said first conduit, said liquid source comprising:

a cavity, said cavity operable to hold a volume of liquid, and a pump for pumping said liquid in said cavity; and expelling said liquid from said first conduit as minute droplets of said liquid, wherein said plurality of openings are equally distanced from said periphery of the central portion and said liquid is expelled through said openings around a facial area of said user.

8. The method of personal cooling of claim 7, wherein expelling said liquid comprises expelling the liquid under pressure through said plurality of openings in said first conduit.

9. The method of personal cooling of claim 7, wherein said pump is a mechanical pump physically operable by said user to pump said liquid.

10. The method of personal cooling of claim 7, wherein said pump is an electric pump operable with electricity to pump said liquid.

11. The method of personal cooling of claim 10, wherein said electric pump comprises:

a switch, said switch operable to turn said electric pump on or off; and a controller, said controller selectively operable to adjust a voltage or a current delivered by a portable battery to said electric pump.

12. The method of personal cooling of claim 7, wherein operatively connecting said liquid source to said first conduit comprises:

operatively connecting a first end of a second conduit to said first conduit in a substantially watertight manner, and operatively connecting a second end of said second conduit to said liquid source in a substantially watertight manner; wherein said second end of said second conduit has access to said volume of liquid in said cavity.

13. A portable personal cooling device, comprising:

a headgear, said headgear wearable on a head of a user;

a brim on said headgear;

a first conduit implemented in said brim in a circular pattern extending around a periphery of a central portion of said headgear;

a second conduit having a first end and a second end, wherein the first end of said second conduit is operatively connected to said first conduit in a substantially watertight manner;

a liquid source, wherein said liquid source is operatively connected to the second end of said second conduit in a substantially watertight manner;

a cavity in said liquid source, wherein:

said cavity is operable to hold and carry a liquid, and said second end of the second conduit has access to the liquid in said cavity;

a pump in said liquid source, wherein said pump is operable to pump the liquid in said cavity under pressure through said second conduit to said first conduit; and said pump is either a mechanical pump or an electrical pump; and a plurality of openings defined in said first conduit and located at a bottom side of said brim, said plurality openings equally distanced from said periphery of the central portion, wherein said plurality of openings are configured to expel said liquid as minute droplets of the liquid around a facial area of said user.

* * * * *